United States Patent [19]

Rich et al.

[11] 4,086,152

[45] Apr. 25, 1978

[54] OZONE CONCENTRATING

[75] Inventors: Stanley R. Rich, Eastman, N.H.;
Theophanes G. Pantazelos,
Framingham, Mass.

[73] Assignee: RP Industries, Inc., Hudson, Mass.

[21] Appl. No.: 788,149

[22] Filed: Apr. 18, 1977

[51] Int. Cl.² .......................... B01K 1/00; C01B 13/11
[52] U.S. Cl. .................................... 204/176; 250/532;
250/538; 250/541
[58] Field of Search ................ 204/176; 250/532, 538,
250/539, 540, 541

[56] References Cited

U.S. PATENT DOCUMENTS

| 3,622,492 | 11/1971 | Kinney | 250/541 |
| 3,883,413 | 5/1975 | Douglas-Hamilton | 204/176 |
| 3,963,625 | 6/1976 | Lowther | 250/533 |
| 4,038,165 | 7/1977 | Lowther | 204/176 |

FOREIGN PATENT DOCUMENTS

| 689,301 | 6/1964 | Canada | 250/541 |

*Primary Examiner*—F.C. Edmundson
*Attorney, Agent, or Firm*—Wolf, Greenfield & Sacks

[57] ABSTRACT

Apparatus and methods are disclosed for producing ozone by treating an oxygen-containing gas such as air with electrons or negative gas ions and repeating the treatment as by recirculation to produce at high energy efficiency a concentration of ozone sufficient for effective direct treatment of waste water. Ozone concentrations well in excess of 10,000 parts per million in air have been produced.

An ion accelerator is a preferred source of electrons or negative ions.

10 Claims, 4 Drawing Figures

OZONE CONCENTRATING

BACKGROUND OF THE INVENTION

According to Webster's New International Dictionary–Unabridged, 1957, page 1748, "OZONE is a faintly blue, gaseous, allotropic form of oxygen, present in minute amounts in the atmosphere, especially in the upper regions, and obtained (usually much diluted) by the silent discharge of electricity in ordinary oxygen or in air, and by other methods; it has the molecular formula $O_3$, being one and one half times as dense as ordinary oxygen gas. It is a much more powerful oxidizer than oxygen gas, and comparatively unstable, (i.e.: decomposes at high temperatures). Ozone is used commercially for sterilizing water, purifying air, bleaching, etc."

In the known prior art "silent discharge" devices ozone is produced by passing oxygen or air through long discharge tubes made of concentric glass cylinders which are metal-coated on innermost and outermost walls, the gas being passed through the annular space between the cylinders. Low-frequency, high voltage alternating current is applied to the metal coatings and ozone is formed in the gas. An illustration of such an ozonizer can be found in FIG. 2 on page 1264 of Van Nostrand's Scientific Encyclopedia fourth Edition, published by D. Van Nostrand Company, Inc., Princeton, N.J., 1968 (Library of Congress Catalog Card No. 68-20922). This process of producing ozone by "silent discharge" has been found to be inefficient. The alternating current discharge produces positive and negative ions together with the ozone and, among other things these oppositely charged ions can recombine, generating heat in the gas. Ozone is destroyed by high temperatures and the recombinations of oppositely-charged ions may destroy some of the ozone produced in such devices and does in fact destroy ozone in many prior art devices. Cooling of the ozonizer walls is required to prevent thermal decomposition of the ozone produced. Moreover, moisture greatly reduces the efficiency of ozone production with the silent discharge. In consequence, according to the known current practice, air (or other oxygen-bearing gas) that is to be used for ozone production is refrigerated and dried to a dewpoint of minus 60° F before it is introduced into the "silent discharge" ozone generator. This is costly and the required equipment occupies a great deal of space, and consumes energy.

It now appears to be generally accepted that ozone will replace chlorine for most types of water treatment provided that the costs involved can be adequately decreased. At present, using silent discharge, 10 to 15 kilowatt-hours of electric power are required to generate one pound of ozone. Part of this power is consumed by the air or oxygen pretreatment equipment. Chlorine requires less than half as much energy, resulting in substantially lower costs. The present invention makes use of the fact that ozone can be produced more efficiently by a negative electric discharge, for example, an electron beam, than by an alternating current silent discharge. When an electron beam is employed in practicing the invention, moisture in the gas to be treated by an electron beam will not materially degrade the efficiency of ozone generation; water molecules will be split into H, H, and O — and the O atoms will combines with other O atoms to form oxygen and ozone. In accordance with the invention, the air or other oxygen-bearing gas which is treated to produce ozone is recirculated in a closed loop, to be irradiated again and again by one or more negative electric discharge ozone generators. Any ozone that does not decompose in the recirculation path will recirculate and will have added to it ozone newly produced on each pass of the gas by the generator(s). Any ozone disrupted by negative ions can recombine again as either ozone or oxygen. Concentration of ozone in an oxygen-bearing recirculating gas will thus rise until an equilibrium is reached between ozone-bearing gas leaving the system and oxygen-bearing gas that enters it. In the present invention employing a negative electric discharge it is possible to reach an ozone concentration well in excess of 10,000 parts per million in air or in a similar recirculating carrier gas. The invention thus contributes new and more useful methods and means to concentrate ozone.

When ozone is produced for water treatment, it is desirable to have about 1 to 3 parts per million ozone dissolved in the water which is being treated, a greater amount being required where other ozone traps or ozone-consuming products are in the water. Thus, relatively good, clean water can be purified or disinfected with about 1 p.p.m.; typical sewage containing organic waste, soaps and detergents, industrial waste and the like is generally better treated with 3 p.p.m. dissolved ozone. According to Henry's Law, the concentration of ozone that can be introduced into water by mixing ozone-bearing air and water in equilibrium conditions varies with the concentration (or partial pressure) of ozone in the air, and to produce about 3 p.p.m. ozone in the water a concentration of 10,000 p.p.m. (or about 1%) ozone in air is a valuable threshold objective.

In other words, if ozone generation is to be a useful art in water purification, it should produce at least about 10,000 p.p.m. ozone in air or other carrier gas, should have a production efficiency about as good as or preferably better than about 6 or 7 k.w.h. per pound, and should not require expensive or dangerous processing steps. Specifically, it should be possible to use air rather than pure oxygen as its raw material and should not require the expenditure of additional energy to pretreat or dry the air.

GENERAL NATURE OF THE INVENTION

The objectives listed above are achievable by the present invention in which ordinary air is repeatedly recirculated through a system having a negative ion source or is passed through a system having a plurality of negative ion sources to produce ozone concentration greater than 10,000 parts per million at production efficiencies in the range of 2 to 5 kilowatt hours per pound of ozone produced. As higher ozone concentrations are reached, because of decomposition of ozone, decrease in efficiency is to be expected, but up to 19,000 p.p.m. ozone in air has been produced without apparent decrease in efficiency.

A presently preferred source of negative ions or electrons is an ion accelerator, but negative polarity direct current corona devices have produced high ozone concentration although with poorer efficiency.

When electrons are introduced into the oxygen-containing gas from an electron source such as an ion accelerator, a corona electrode or the like, they quickly produce negatively charged ions, and these electrons or ions or both bring about the production of the ozone which is formed. For simplicity of language these negative charges are herein called negatively charged ions.

The raw material may be a gas other than ordinary air, such as oxygen-enriched air, oxygen in a different carrier gas, or simply oxygen itself, and the ozone can be recovered, concentrated, or used for other purposes, but when the ozone generation is for the purpose of water purification it is presently recommended that ordinary air be used, that it be treated to form at least 10,000 p.p.m. ozone and then simply mixed with the water under equilibrium conditions.

Prior art efforts to meet the objectives of high ozone concentration and practical efficiency of ozone generation have been unsuccessful. Generally, high concentration at high ozone generating efficiency has not been possible with alternating current silent discharge ozone generation, and even moderately good concentration has been accompanied by poor efficiency. Ozone is decomposed by heat, and apparently as concentration is increased, so also is wasteful decomposition. For example, Kinney, U.S. Pat. No. 3,622,492, asserts achievement of about 1% ozone concentration, but at the cost of excessive energy loss: according to the Kinney patent, column 5, reaching 1.15% ozone consumes over 11 Kwh per pound of ozone, not including auxiliary power such as pumps, blowers and the like. Thus, recirculation through an alternating current discharge causes decomposition of ozone and consequent reduction of ozone generating efficiency. Well known prior results, for example, the book "Ozone Chemistry and Technology," No. 21, of the Advances in Chemistry Series, shows on p. 464 an efficiency of 7.73 Kwh/pound, and "Ozone in Water and Wastewater Treatment" by Francis L. Evans, III, Environmental Protection Agency on p. 153 shows 7.3 Kwh/pound at 1.25% ozone concentration. All of these prior art efforts show seriously decreasing efficiency as 10,000 p.p.m. ozone is approached.

Douglas-Hamilton, U.S. Pat. No. 3,883,413 shows a theoretical efficiency of about 3 Kwh/pound at ozone concentrations of 0.4% ozone, generated in pure oxygen, but does not appear to have actually achieved even this relatively moderate concentration. Moreover, oxygen is required as a feed gas, which is an added and substantial cost element. In addition, an auxiliary electric field is required in the Douglas-Hamilton invention and the power consumed to sustain this field adds materially to the system losses.

It appears, therefore, that the need for ozone production to yield high concentrations of ozone without dwindling energy efficiency is an unmet need which the present invention can now meet.

The nature of the invention is further described in connection with the drawings, in which.

DETAILED DESCRIPTION OF THE DRAWINGS

Figure 1A:
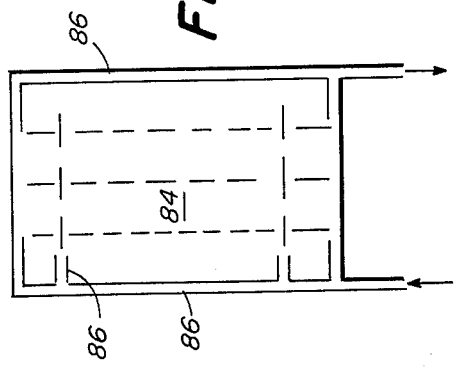
FIG. 1A is a view of a window support for the apparatus of FIG. 1.
Figure 1:
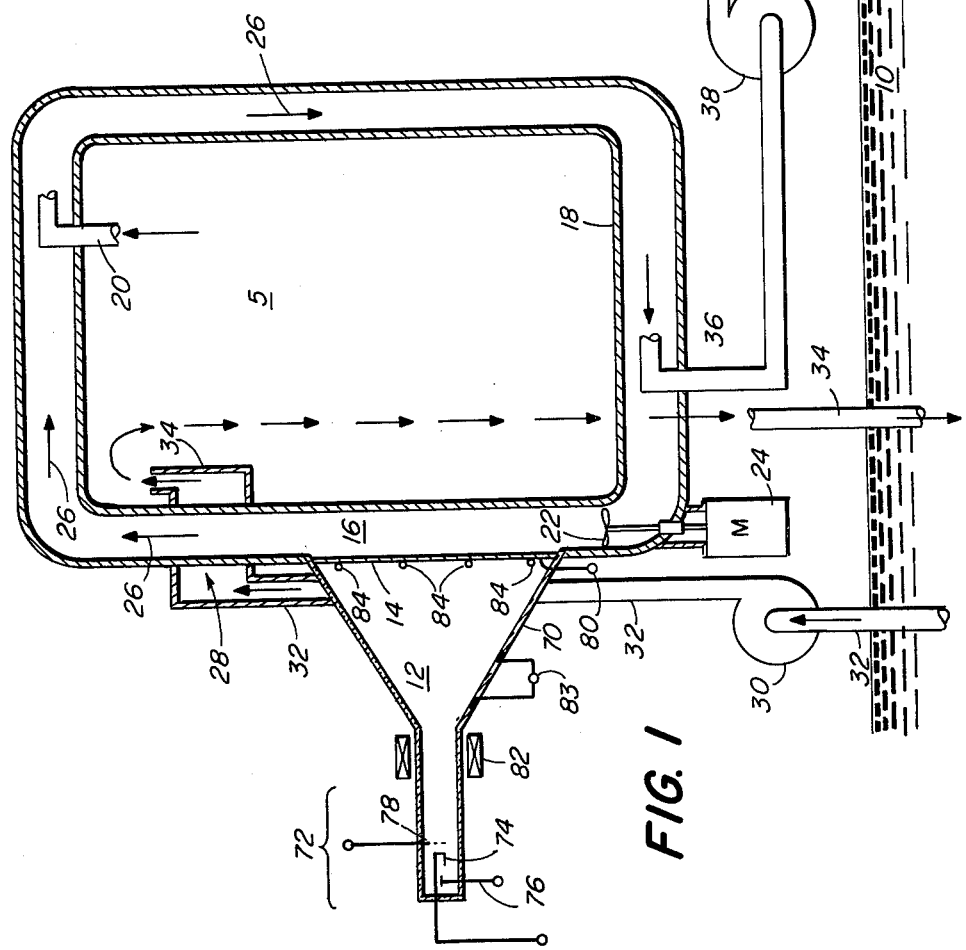
FIG. 1 is a schematic view of a system for generating ozone and treating liquid therewith according to one embodiment of the invention.

FIG. 1 illustrates a system employing an ozone concentrator 5 according to the invention to treat a body of water 10 with ozone. The body of water may be a river or a lake, or a waste-water collector for sewage or other effluent, as a few examples. A negative electric discharge is provided by a source of electrons 12, representing an electron accelerator, supplying electrons through a window 14 into a closed-loop path 16 that is defined by a closed-loop conduit 18. An oxygen-bearing gas (not shown) such as air is introduced into the path 16 through an input conduit 20. There is no requirement to be concerned with the moisture content of this gas. A fan 22 inside the conduit 18 driven by a motor 24 mounted outside the conduit forces gas in the path 16 to circulate and recirculate in a clock-wise direction represented by arrows 26 in the path 16. The fan is located in the path 16 up-stream from the electron source 12, in a position to drive the oxygen-bearing gas past the window 14. A heat exchanger 28 is coupled to the conduit 18 immediately down-stream in the path 16 from the electron source 12, for maximum effect in extracting heat from the gas after exposure to electrons from the source 12, thereby to inhibit destruction of ozone by heat. Water from the water body 10 is brought to the heat exchanger via a pump 30 and input conduit 32, and returned to the water body via an output conduit 34, thereby to use as a heat sink the same body of water that is intended to be treated with ozone.

A gas output conduit 36 extracts a continuing sample of gas from the mass of gas recirculating in the path 16 of the ozone concentrator 5, and with the aid of a pump 38 the extracted gas is supplied to a quantity of water 40 in a tank 42. A pump 44 extracts water from the body 10 via a tank input conduit 46 and supplies that water to the tank 42 at the top 50. A tank return conduit 52 coupled to the tank below the input conduit 46 but near the top 50 returns the water from near the top of the quantity 40 to the body 10. The output conduit 54 from the pump 38 traverses the interior of the tank 42 near the bottom and is fitted with outlets 56 to diffuse gas into the quantity of water 40. A series of vertical baffles 58, 60 constrains the water 40 in the tank to flow in a generally tortuous path from the tank input conduit 46 to the tank return conduit 52. A gas exhaust vent 62 is provided through the top 50 of the tank, and a combustible-gas conduit 64 is provided for a gas-flame to destroy residual ozone, if any is present.

The electron source 12 includes an evacuable envelope 70 that is fitted with an electron source 72 at one end (the "neck" end) and holds the window 14 at the other end. The electron source 72 comprises the usual components, — a cathode 74, a cathode heater 76, and an electron accelerator 78. The envelope 70 may be made of an electrically nonconductive material such as glass. The window 14 may typically be made of a thin sheet of aluminum, capable of being traversed by high energy electrons. To form an electron beam the cathode (and the cathode heater) may be maintained at a negative potential ($-$) 100,000 volts; the accelerating electrode may be maintained at a relatively "smaller" negative potential ($-$) 90,000 volts; and the window 14 may be maintained at a potential that is positive with respect to the electron source, as by connecting it to ground via terminal 80. A beam focusing and scanning assembly 82 is fitted to the neck of the envelope, between the electron source 72 and the window 14.

In operation, the electron source 12 will have its envelope 70 evacuated (e.g.: to a pressure in the range 0.001 to 30 microns) via a nipple 83 which can be sealed off. To prevent implosion of the window 14 a supporting grid 84 is put in place behind it, within the evacuated space. Typically, the supporting grid is fitted with hollow tubes 86 through which a cooling fluid (e.g.: water) can be passed (FIG. 1A).

Operation of the system illustrated in FIG. 1 can now be appreciated. Oxygen in the form $O_2$ in the gas recirculating in the path 16 is bombarded by electrons from the source 12, and some of that oxygen is converted to ozone-$O_3$. The electron bombardment creates some heat, and the heat exchanger 28 removes heat from the gas stream immediately after it leaves the window 14 in order to inhibit the destruction of ozone by the heat. As the gas in the path 16 is repeatedly circulated past the window 14 the concentration of ozone in the mass of gas contained in the closed-loop conduit 18 increases substantially linearly, as will be presently explained.

The recirculating conduit 18 is constructed preferably of stainless steel or other material resistant to oxidation by ozone. Electrical insulating materials used (if required) are preferably glass or ceramics.

If a plastic material is desired for the ductwork, or for bearings (as at the shaft of the fan 22) or seals, a tetrafluoroethylene polymer (available under the trademark "TEFLON") is preferred. It is understood that this polymer can be successfully employed over a temperature range of $-75°$ to $+250°$ C.

In the electron beam generator 12, aluminum foil is a preferred material for the window 14 because it yields acceptable performance for an acceptable cost. Beryllium is more transparent to electrons than aluminum, i.e. — has lower loss, but the cost is higher. Thus, if acceptable on a cost basis, beryllium would be preferred for the window 14.

Figure 2:
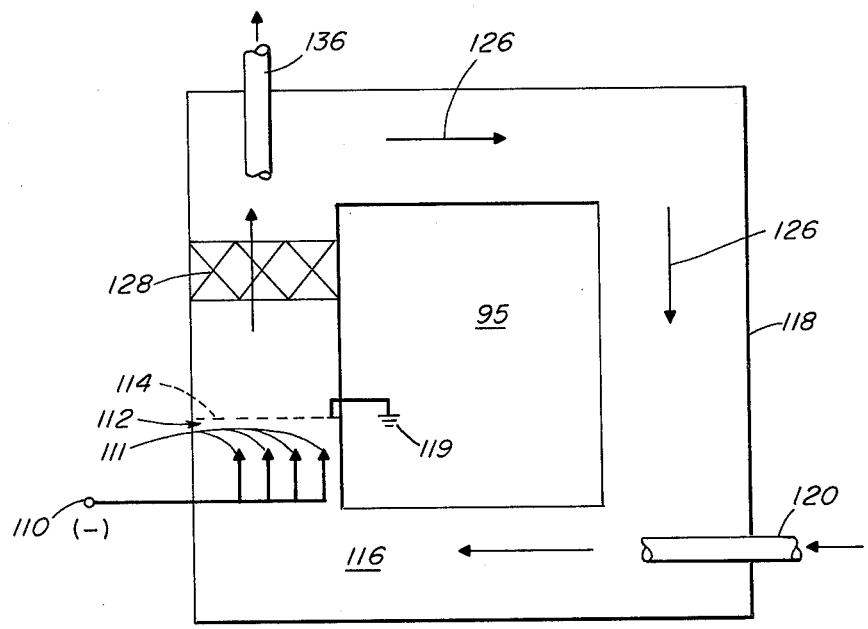
FIG. 2 is view of a system for generating ozone according to another embodiment of the invention.

In FIG. 2 an ozone concentrator 95 is fitted with a source of negative electric discharge in the form of a DC-operated ionizer 112 comprising an array of sharp-edged electrodes 111 connected together to a terminal 110 for connection to a supply of negative DC voltage (not shown). A porous screen 114 of electrically-conductive material is spaced a distance from the electrodes across the closed-loop path 116 in which an oxygen-bearing gas is made to flow, in the direction of arrows 126, and is grounded, as at 119. The path 116 is defined by a closed-loop conduit 118, similar to the conduit 18 in the ozone concentrator 5 (FIG. 1). A gas input conduit 120 provides oxygen-bearing gas to the path 116, and a gas output conduit 136 is used to extract ozone-enriched gas from the path 116. The DC-operated ionizer 112, when energized, develops an electrostatic wind in the gas present in the closed-loop path 116, thereby functioning not only to generate ozone in the oxygen-bearing gas, but also to propel that gas in the direction of the arrows 126 in that path, so that there is no requirement for a separate gas-propulsion mechanism, such as the fan 22 in the ozone concentrator 5 of FIG. 1. A heat exchanger 128 is shown schematically in FIG. 2, having the same function as the heat exchanger 28 in the ozone concentrator 5 of FIG. 1. It will be apparent that the ozone concentrator 95 of FIG. 2 and the ozone concentrator 5 of FIG. 1 are interchangeable in systems, such as the system illustrated in FIG. 1, for making use of ozone.

We have constructed an ozone concentrator according to FIG. 2 employing three DC-operated ionizers 112 in positions, approximately equally spaced around the closed-loop path 116, in which the cross-section of the conduit 118 was 3 × 10 in. and the average length of the path 116 around the conduit was 73 in. The conduit 118 was constructed of stainless steel, and only ceramic insulating materials were used, to minimize loss of ozone due to oxidation of parts. The ionizer were energized with a potential difference of 21 KV, and current of 2.75 milliampers, between their respective electrodes 111-114, and with air in the conduit an electrostatic wind was developed having an average velocity of 304 ft. per min., as measured across the velocity profile with a velometer (Alnor 6000 P), giving a flow rate of 6.34 cu. ft. per min. Thus, recirculation of the gas in the path 116 was at the rate of 49.4 revolutions per minute.

Figure 3:
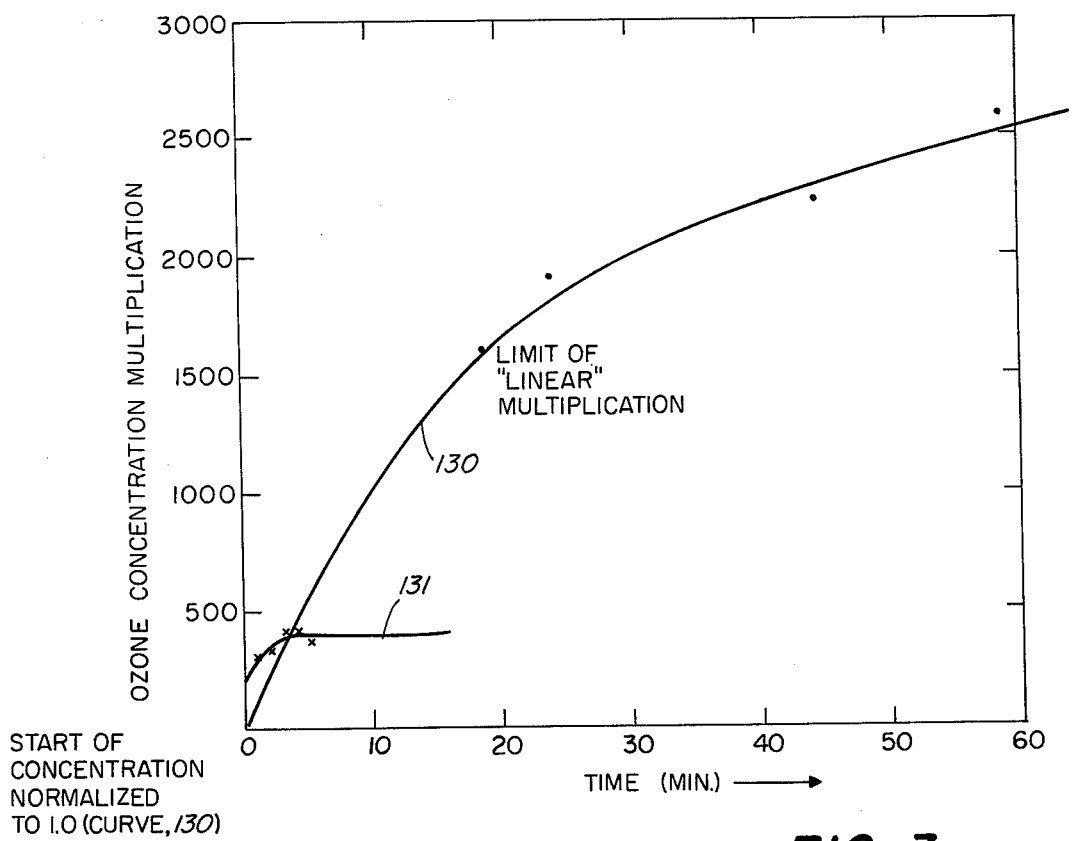
FIG. 3 is a graph of certain results obtained with the ozone generator of FIG. 1.

With the conduit 118 opened, an initial (single-pass) concentration of ozone was measured at 1 part per million, using a measuring instrument manufactured by Thermoelectron Corp., model 10 Serial Nos. Eng. 012, 013, 014, based upon the photo-luminescent reaction between nitric oxide and the ozone, which was calibrated to be direct-reading in parts per million of ozone. Measurement of ozone concentration was done also with a standard potassium iodide titration method. With the conduit 118 closed to provide recirculation of gas in the path 116, a measurement of ozone concentration was taken every 15 seconds for 5 minutes. We found that multiplication of ozone concentration in the mass of air re-circulating in the path 116 was uniform and linear within 10% to approximately 12 minutes of running time, at which point the multiplication of ozone concentration was 1,600 times. FIG. 3 shows this result graphically. The curve 130 connects a series of points plotted from the data that were taken. Equilibrium of ozone concentration was reached at 2,650 parts per million, and the curve 130 illustrates this level, which extends beyond the linear region. The data represented in curve 130 are the average of five runs taken on the same day, during which the data were measured with both the photoluminescent ozone meter, and the standard potassium iodide (KI) reduction method, this method having been employed in order to calibrate the photoluminescent meter. The results were as follows:

TABLE I

| RUN NUMBER | MAXIMUM CONCENTRATION (ppm) By photoluminescent meter | By KI Reduction Method |
|---|---|---|
| 1 | 2,100 | 2,259 |
| 2 | 2,205 | 2,599 |
| 3 | 1,950 | 2,357 |
| 4 | 1,816 | 2,226 |
| 5* | 1,150 | 1,433 |

*Run 5 was deliberately limited to the "linear" part of curve 130

All of the readings stated in Table I were taken in such a way that each KI reduction method measurement was made simultaneously with the corresponding photoluminescent meter reading.

Increase in size of the test apparatus described above resulted in achievement of 19000 parts per million of ozone in untreated air. The negative corona generators were enlarged and furnished with 10 times the power that was introduced in the tests described above.

Data was taken showing concentrations substantially 10 times the original, culminating in ozone concentration of 19000 parts per million.

An attempt to duplicate with an alternating current discharge (silent discharge) type of ozone generator the foregoing results obtained with a negative electric discharge type of ozone generator failed to produce comparable results. With the negative electric discharge type of generator we obtained a linear increase in ozone concentration up to about 2050 times the open-loop (initial) concentration within about 26 minutes and found an increase of 75 times within the first minute. By contrast, we were unable to achieve either a linear increase in ozone concentration, or an increase more than a total of 3 times in 5 minutes of operation with a silent discharge type of ozone generator that we constructed and installed in the same recirculation system.

Using a commercially-available silent discharge type of ozone generator ("Welsbach" ozone generator Model T816) that was purchased on the open market, the output of this generator was connected back to the input to provide an ozone concentrator having a recirculation path of the kind contemplated in the present invention. An "oil-less" compressor was used to make this connection. We selected an "oil-less" compressor to avoid loss of ozone because oil is oxidizable. The recirculation rate was adjusted to be equal to the normal rate of air throughput, which was 9 liters per minutes for this specific generator. A sampling port was provided in the recirculation path, from which a sample was withdrawn at the rate of 0.6 liter per minute. These conditions established a recirculation to throughput ratio of 15:1.

Measurements of ozone concentration were made, using the dual instrumentation described above, both on an "open loop" basis (starting concentration) and using recirculation. A first run was made for 5 minutes with the power input to the ozone generator set at maximum, which gave a measurement of 4,500 ppm of ozone on an "open loop" basis. The results were as follows:

TABLE II

| TIME (Minutes) | Ozone Concentration (ppm) |
|---|---|
| 0 | 4,500 (open loop) |
| 1 | 6,400 |
| 2 | 8,400 |
| 3 | 8,800 |
| 4 | 8,850 |
| 5 | 8,900 |

At the end of 1 minute, the concentration had increased by less than one-half, and in the next minute the net increase was nearly the same; in the next 3 minutes there was hardly any increase. At the end of 5 minutes the increase in concentration of ozone was about 2 times the "open loop" starting concentration. This is an increase that is far lower than we obtained when the ozone is created by an electron source.

For the second run, the power level was set so that the starting ozone concentration was 125 ppm on an "open loop" basis, in order to determine if by starting at the higher concentration level a saturation level had been reached, which mightnot occur at a lower starting level. The following data were taken at the reduced starting ozone concentration level:

TABLE III

| TIME (MINUTES) | OZONE CONCENTRATOR (ppm) |
|---|---|
| 0 | 125 (open loop) |
| 1 | 320 |
| 2 | 330 |
| 3 | 460 |
| 4 | 390 |
| 5 | 395 |

These results are similar to those found at the higher starting ozone concentration level. In both cases the ozone concentration increased much more slowly than was found using an electron source type of ozone generator, and no linear increase in ozone concentration was found. In each case, if linear build-up of ozone concentration had occurred, an increase of at least about 15 times the open-loop concentration would have been expected to be added to the initial concentration each minute. That did not happen.

The sharp contrast between an increase of ozone concentration as high as 2,600 times the initial concentration on the one hand, and an increase of only 2 or 3 times the initial concentration on the other hand, suggests that the alternating current discharge used in the silent discharge generator destroys nearly as much ozone as it produces, and that the silent discharge type of generator can produce high concentration of ozone only at the expense of expenditure of large amounts of electric energy.

The present invention is thus seen to achieve unexpected increases in ozone concentration with use of an ozone generator employing an electron source. Such a source can be provided by means in addition to those illustrated and described herein, for example, beta-emitting radioactive materials, plasma discharge in which electrons are extracted from the plasma and projected onto an ozone-generator region, various forms of electron accelerators with and without beam-scanning means, and ionizing devices as used in the electrostatic precipitator art which generate negative ionization (as opposed to positive ions), to suggest a few. Moreover, it is not intended to overlook refinements for removing or reducing the adverse effects of ions in the space where oxygen interacts with the negative electric dischare for it is well-known that positive and negative ions may be produced along with electrons, and that recombination of such ions produces heat which can destroy ozone. Thus refinements contemplating the use of auxiliary electrodes (e.g.: positive electrodes) or magnetic fields in or near the interaction space may be added to ozone concentrators according to the invention as the art develops, in order further to improve their ability to increase the concentration of ozone at low levels of expenditure of electric energy.

We claim:

1. A method of generating ozone in an oxygen-bearing gas to produce a concentration of ozone in said gas in excess of 10,000 parts per million, comprising the steps of providing a quantity of said gas in a confined path, treating said quantity essentially solely with negatively charged ions to generate ozone from a minor portion of said oxygen, and repeating said treatment of substantially all of said quantity of said gas a plurality of times to increase the concentration of said ozone substantially linearly with respect to energy consumption to a level in excess of 10,000 parts per million.

2. The method of claim 1, wherein said treatment of said gas is carried out by recirculating said gas in said confined path.

3. The method of claim 2 wherein said gas is air.

4. A method according to claim 2 including the further steps of maintaining continuous flow of ozone-containing air by extracting from the recirculating gas an amount constituting a minor portion thereof, and replenishing an equal amount of oxygen-bearing gas into the recirculating gas.

5. A method according to claim 4 including the further step of maintaining the temperature of the recirculating gas below a temperature at which ozone is destroyed.

6. A method according to claim 2 including the further step of maintaining the temperature of the recirculating gas below a temperature at which ozone is destroyed.

7. A method of generating ozone in an oxygen-bearing gas comprising the steps of providing a quantity of said gas in a confined path, treating said quantity with negative ions so as to generate ozone from a minor portion of said oxygen, and repeating said treatment of substantially all of said quantity of said gas a plurality of times by recirculating said gas in said path to increase the concentration of said ozone substantially linearly with respect to energy consumption to an ozone concentration suitable for treating waste water.

8. The method of claim 7, wherein said treatment of said gas with negative ions employs an ion accelerator as an electron source.

9. The method of claim 8, wherein said treatment of said gas with negative ions employs a negative corona electrode as an ion source.

10. A method of generating ozone in an oxygen-bearing gas to produce a concentration of ozone in said gas in excess of 10,000 parts per million, comprising the steps of providing a quantity of said gas in a confined path, treating said quantity with electrons in the substantial absence of positively-charged ions so as to generate ozone from a minor portion of said oxygen, and repeating said treatment of substantially all of said quantity of said gas a plurality of times by recirculating said gas in said path to increase the concentration of said ozone substantially linearly to a level in excess of 10,000 parts per million.

* * * * *